(No Model.) 2 Sheets—Sheet 1.
J. S. BARNES.
CANOPY FOR BICYCLES.
No. 504,900. Patented Sept. 12, 1893.
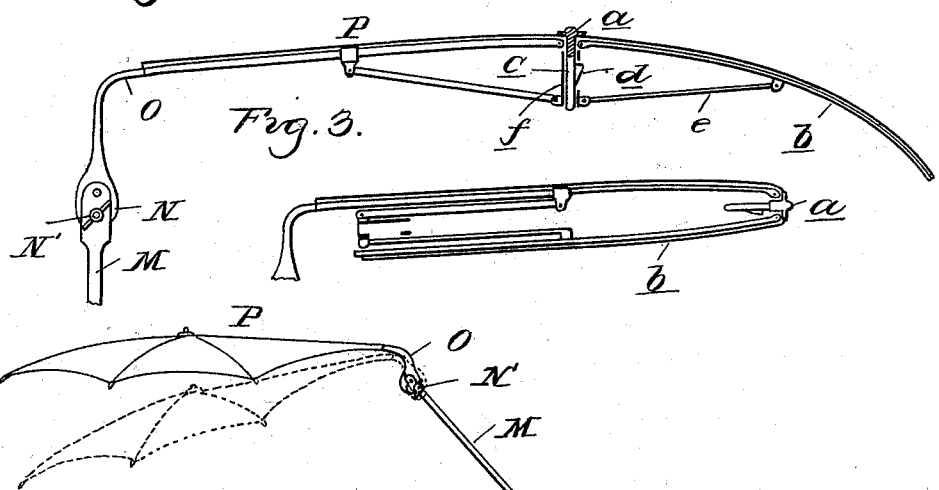
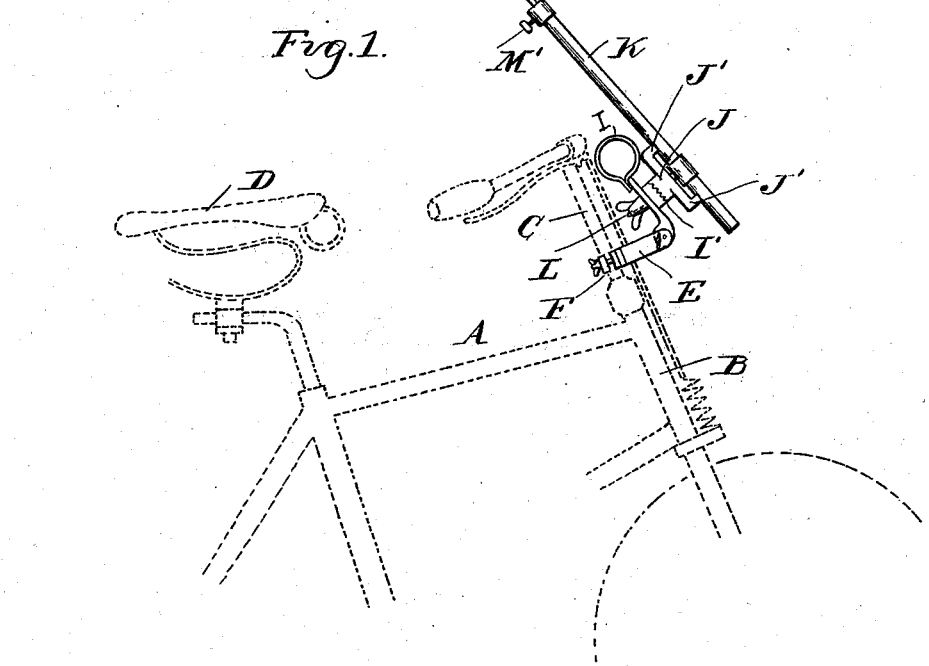
Witnesses
A. L. Hobbie
P. M. Hulbert
Inventor
John S. Barnes
By [signature]
Attys.

(No Model.) 2 Sheets—Sheet 2.
J. S. BARNES.
CANOPY FOR BICYCLES.
No. 504,900. Patented Sept. 12, 1893.
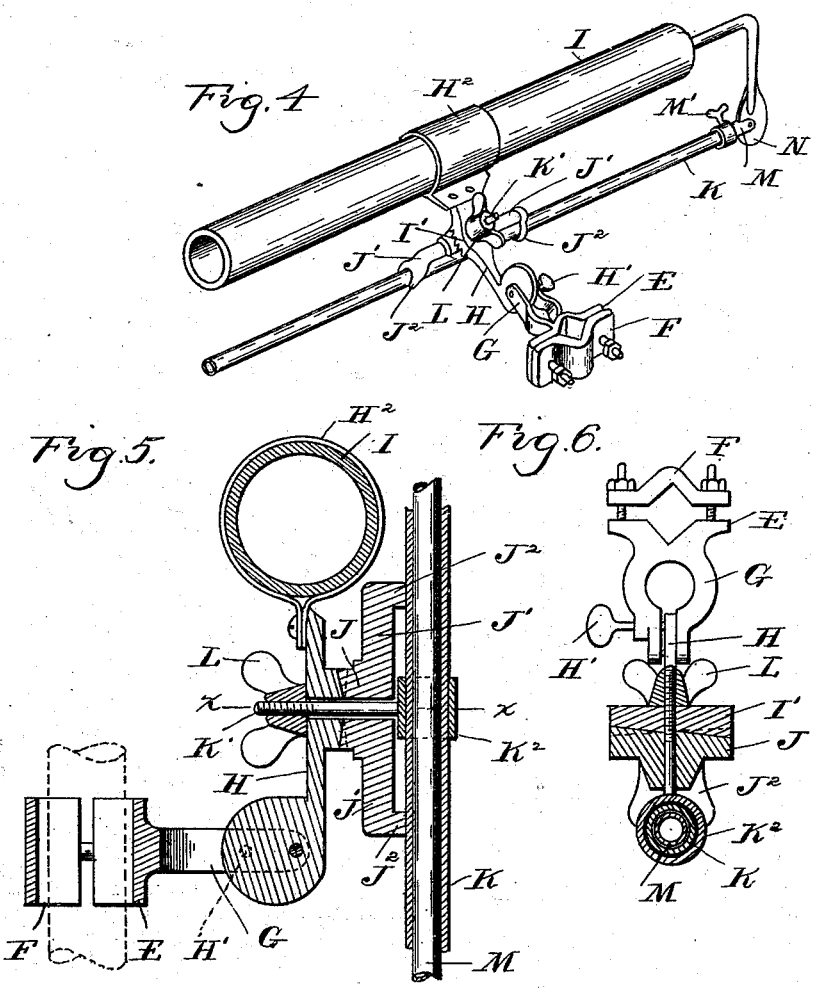
Witnesses
N. L. Nobbie
P. M. Hulbert
Inventor
John S. Barnes
By Ross & Spragueson
Attys.

UNITED STATES PATENT OFFICE.

JOHN S. BARNES, OF DETROIT, MICHIGAN, ASSIGNOR OF ONE-HALF TO JOHN S. ELLIS, OF SAME PLACE.

CANOPY FOR BICYCLES.

SPECIFICATION forming part of Letters Patent No. 504,900, dated September 12, 1893.

Application filed August 23, 1892. Serial No. 443,836. (No model.)

*To all whom it may concern:*

Be it known that I, JOHN S. BARNES, a citizen of the United States, residing at Detroit, in the county of Wayne and State of Michigan, have invented certain new and useful Improvements in Canopies for Bicycles, of which the following is a specification, reference being had therein to the accompanying drawings.

This invention relates to new and useful improvements in bicycle canopies, and the invention consists in the peculiar construction of a canopy designed to be secured to a bicycle in such a manner as to protect the rider from the sun or rain and whereby it may be adjusted vertically or laterally, and further in the peculiar construction of the shade or umbrella, and the manner of attaching it to the standard whereby in riding it presents little or no surface for resistance to the wind, and when not in use it may be folded and stowed away in the case provided upon the bicycle.

The invention consists further in the combination, arrangement and construction of the various parts all as more fully hereinafter described.

In the drawings, Figure 1 is a side elevation of my improved device showing it as applied to a bicycle. Fig. 2 is a vertical, longitudinal section through the shade or umbrella extended. Fig. 3 is a similar section showing the umbrella folded. Fig. 4 is a detached perspective view of the umbrella holder showing the umbrella stowed away in the case as when not in use. Fig. 5 is a vertical section through the shade holder or bracket, the parts being nearly in the position shown in Fig. 1. Fig. 6 is a horizontal section on line $x$ $x$ in Fig. 5.

A is a bicycle frame having the front standard B in which is secured the usual handle bar C, and D is the seat these parts being of known and usual construction. To such a bicycle I desire to attach a canopy which may be adjusted to any desired height or angle to the rider, and which may be stowed away on the bicycle in the least possible room making it light and compact.

E is a bracket having the clamp F at its rear end, by means of which it may be secured to the standard B at the front of the bicycle. This bracket is provided with a bifurcation G at the front end, in which is pivoted the arm H, a clamping screw H' being adapted to hold the arm at any desired point to which it may be adjusted upon its pivot. This arm at its upper end is provided with a ferrule H² in which is secured a tubular casing I, extending horizontally and forming a case for the umbrella when the latter is stowed away as will more fully hereinafter appear. On its forward face this arm is provided with a serrated disk I'. J is a correspondingly serrated disk having arms J' extending on opposite sides thereof and provided with circular bearings J².

K is the umbrella standard formed of a tube resting in the bearings J² of the arms J' and held therein by means of the clamping bolt K' and winged nut L, said bolt having a socketed bearing K² embracing the standard, and at the same time clamping the two disks I' and J together.

M is an extension of the standard K telescopically moving therein and adapted to be held in its adjusted position by means of the set screw M'. The upper end of this rod M is bifurcated and in this bifurcation is pivoted the plate N. A set screw N' is adapted to hold the plate in its adjusted position. This plate is formed in the nature of a right angled offset at the end of the rod or bar O, which preferably forms one rib of the shade or canopy P, preferably of the following construction.

$a$ is a head to which is pivoted a series of curved ribs $b$ at the rear edge and sides and one or more substantially straight ribs, such as O at the front edge. To this rib O is hinged a stem $c$ having a spring catch $d$.

$e$ are braces secured at one end at substantially the middle of the ribs and at the other end to a runner $f$ adapted to engage with the stem $c$ and suitably constructed to engage with the spring catch $d$.

The parts thus constructed are adapted to operate and be used as follows: To adjust the umbrella for use, which is extended as described, the extension M is withdrawn from the standard K to the desired length, and the set screw M' is tightened to hold the extension in its adjusted position. The nut L is loosened and the disk J and standard K are turned to the desired angle to the standard, and this nut is then tightened, clamping the two serrated disks together and clamping the standards to the arms J' as described. The arm H is turned forward or backward the set screw in the bracket having been loosened, and again tightened when the right angle is reached. The shade P is then adjusted up or down as desired and is then held in its adjusted position by the set screw N'. In this position the shade is adapted to protect the rider being over the seat and at one side or the other according as the snow or rain would beat upon the rider. It will be seen that the canopy extends rearwardly from the standard, and is constructed with a substantially straight forward edge, so that in the movement of the bicycle the canopy will be drawn through the air from its forward edge preventing danger of turning or twisting as would be the case if it were supported from the center or from its rear edge. By making the forward edge of the canopy substantially in a horizontal plane or flat it draws through the air with the least possible resistance without in any way detracting from its usefulness as a shade or protection from the weather.

It will be seen that by means of the construction described whereby the umbrella or shade is hinged to the standard and whereby the standard is made adjustable on the frame I can obtain any desired angle in relation to the rider for the canopy. Where the sun is in front it is evident that the canopy may be turned slightly forward and when the sun is behind it may be turned as shown in dotted lines and held in its adjusted position by the set screw N'. The side adjustments are provided for in the support for the standard, and the height is regulated either by adjusting the standard K or by adjusting the standard M.

To stow away the canopy it is first folded about the rod O, as shown in Fig. 3 by releasing the spring catch d, disengaging the runner from the stem and then turning the ribs upon the pivots until they assume a parallel relation to the rod O. The set screw M' is then loosened and the extension M pushed into the standard K, the nut L is loosened to allow of turning the standard to a horizontal position and the umbrella is inserted in the case I. The set screw M' is then tightened holding it in that position and the nut L also tightened which will hold the parts firmly in their adjusted positions, the umbrella being housed in the casing and the standard reduced to its minimum of length and held in its adjusted position across the front of the bicycle standard.

What I claim as my invention is—

1. In a bicycle canopy, the combination with an adjustable bracket of a casing arranged thereon, a jointed adjustable support on the bracket, a collapsible canopy, and a supporting rib, for the canopy having an angular extension pivoted to the support, substantially as described.

2. In a bicycle canopy, the combination with a support having an extensible section of a collapsible canopy having a supporting extension formed with an angular connecting section pivotally secured to the support, and an inclosing casing for the canopy adjacent to and connected with the support, substantially as described.

3. In a bicycle canopy, the combination with a tubular storage casing, for a canopy of an adjustable support arranged at the side thereof, means for permitting the movement of the support to a position parallel with the casing and a collapsible canopy pivotally secured to the support, substantially as described.

4. The combination with the standard, of a bracket thereon, an arm pivotally secured in said bracket, a canopy support pivotally secured to the arm, a canopy casing supported on the arm, and a collapsible canopy pivotally supported on the support, substantially as described.

In testimony whereof I affix my signature in presence of two witnesses.

JOHN S. BARNES.

Witnesses:
M. B. O'DOGHERTY,
P. M. HULBERT.